United States Patent
Horesh et al.

(10) Patent No.: US 11,593,711 B2
(45) Date of Patent: Feb. 28, 2023

(54) METHOD AND SYSTEM FOR ADAPTIVELY REDUCING FEATURE BIT-SIZE FOR HOMOMORPHICALLY ENCRYPTED DATA SETS USED TO TRAIN MACHINE LEARNING MODELS

(71) Applicant: INTUIT INC., Mountain View, CA (US)

(72) Inventors: Yair Horesh, Hod Hasharon (IL); Yehezkel Shraga Resheff, Hod Hasharon (IL); Shimon Shahar, Rishon Letziyon (IL)

(73) Assignee: INTUIT INC., Mountain View, CA (US)

( * ) Notice: Subject to any disclaimer, the term of this patent is extended or adjusted under 35 U.S.C. 154(b) by 493 days.

(21) Appl. No.: 16/780,534

(22) Filed: Feb. 3, 2020

(65) Prior Publication Data

US 2021/0241166 A1   Aug. 5, 2021

(51) Int. Cl.

| | |
|---|---|
| *H04L 29/06* | (2006.01) |
| *G06N 20/00* | (2019.01) |
| *G06F 21/60* | (2013.01) |
| *G06F 7/483* | (2006.01) |
| *G06N 5/00* | (2023.01) |
| *H04L 9/00* | (2022.01) |

(52) U.S. Cl.
CPC ............. *G06N 20/00* (2019.01); *G06F 7/483* (2013.01); *G06F 21/602* (2013.01); *G06N 5/003* (2013.01); *H04L 9/008* (2013.01)

(58) Field of Classification Search
CPC .......... G06N 20/00; G06N 5/003; G06N 3/08; G06N 3/126; G06F 7/483; G06F 21/602; H04L 9/008
See application file for complete search history.

(56) References Cited

U.S. PATENT DOCUMENTS

| | | | |
|---|---|---|---|
| 2018/0349740 A1* | 12/2018 | Schneider | ............... H04L 9/008 |
| 2022/0067181 A1* | 3/2022 | Carley | ................. G06K 9/6262 |
| 2022/0092216 A1* | 3/2022 | Mohassel | ............... G06N 3/084 |

FOREIGN PATENT DOCUMENTS

WO   WO-2020244788 A1 * 12/2020   ............. A61N 5/103

* cited by examiner

*Primary Examiner* — Kendall Dolly
(74) *Attorney, Agent, or Firm* — Patterson + Sheridan, LLP

(57) ABSTRACT

Certain aspects of the present disclosure provide techniques for adaptively reducing the bit size of features in a training data set used to train a machine learning model. An example method generally includes receiving a data set to be used in training a machine learning model and a definition of the machine learning model to be trained. A reduced number of bits to represent features in the data set is determined based on values of each feature in the data set and the definition of the machine learning model. A reduced bit-size data set is generated by reducing a bit size of each feature in the data set according to the reduced number of bits, and the reduced bit-size data set is encrypted using a homomorphic encryption scheme. A machine learning model is trained based on the encrypted reduced bit-size data set.

19 Claims, 7 Drawing Sheets

400 →

| Input (int32) | Input (binary) |
|---|---|
| 137 | 00000000000000000000000010001001 |
| 150 | 00000000000000000000000010010110 |
| 152 | 00000000000000000000000010011000 |
| 128 | 00000000000000000000000010000000 |
| 154 | 00000000000000000000000010011010 |
| 130 | 00000000000000000000000010000010 |
| 141 | 00000000000000000000000010001101 |
| 163 | 00000000000000000000000010100011 |
| 128 | 00000000000000000000000010000000 |
| 155 | 00000000000000000000000010011011 |

Maximum Number of Bits = 8
ceiling(log(163)/log(2)) = 8

410 →

| Input (int32) | Input (binary) | Input (8-bit binary) | Input - Offset | Input-Offset (binary) |
|---|---|---|---|---|
| 137 | 00000000000000000000000010001001 | 10001001 | 9 | 001001 |
| 150 | 00000000000000000000000010010110 | 10010110 | 22 | 010110 |
| 152 | 00000000000000000000000010011000 | 10011000 | 24 | 011000 |
| 128 | 00000000000000000000000010000000 | 10000000 | 0 | 000000 |
| 154 | 00000000000000000000000010011010 | 10011010 | 26 | 011010 |
| 130 | 00000000000000000000000010000010 | 10000010 | 2 | 000010 |
| 141 | 00000000000000000000000010001101 | 10001101 | 13 | 001101 |
| 163 | 00000000000000000000000010100011 | 10100011 | 35 | 100011 |
| 128 | 00000000000000000000000010000000 | 10000000 | 0 | 000000 |
| 155 | 00000000000000000000000010011011 | 10011011 | 27 | 011011 |

Offset = 128 (Binary 10000000)
Reduced Number of Bits <= 6

FIG. 4

METHOD AND SYSTEM FOR ADAPTIVELY REDUCING FEATURE BIT-SIZE FOR HOMOMORPHICALLY ENCRYPTED DATA SETS USED TO TRAIN MACHINE LEARNING MODELS

INTRODUCTION

Aspects of the present disclosure generally relate to training machine learning models, and more specifically to reducing feature sizes in encrypted data sets used to train a machine learning model.

BACKGROUND

Machine learning models may be used for a variety of purposes. For example, machine learning models may be used to classify data into one of a plurality of categories, identify operations to perform based on a decision tree, predict values of a variable based on values of related variables, and the like. In order for a machine learning model to generate an output, a machine learning model generally needs to be trained to make inferences based on an input. To do so, a training data set may be input into a machine learning model trainer in order to generate the trained machine learning model. These training data sets may be labeled, where a machine learning model is trained using supervised learning techniques, or unlabeled, where a machine learning model is trained using unsupervised learning techniques.

In some cases, machine learning models may be used to perform inferences based on sensitive data. Because such data may be data that is confidential or otherwise of a nature that users would not like to share, such data is typically encrypted. Typical encryption mechanisms, such as the Data Encryption Standard (DES), Triple DES, Advanced Encryption Standard (AES), or other widely used encryption schemes, may be used to ensure that only parties that have the appropriate decryption keys are able to retrieve the underlying data from an encrypted payload. However, these encryption mechanisms may not allow for mathematical operations to be performed on the encrypted data without first decrypting the data.

Fully homomorphic encryption schemes may allow for data to be encrypted and for mathematical operations to be performed directly on the encrypted data (i.e., without requiring that the encrypted data be decrypted in order to retrieve the underlying data on which a mathematical operation is to be performed). For example, in an operation $X+Y=Z$, where $X$ and $Y$ are encrypted values, $Z$ will be an encrypted value $Z'$ that is the sum of $X'$ (i.e., the decrypted value of $X$) and $Y'$ (i.e., the decrypted value of $Y$). Because mathematical operations may be performed on data encrypted using a fully homomorphic encryption scheme, fully homomorphic encryption may be used in various cases where the privacy of the underlying data on which an operation is to be performed should be preserved.

However, performing mathematical operations on fully homomorphically encrypted data may be a computationally expensive operation due to the size of ciphertexts used in these mathematical operations, noise reduction operations that are performed to allow computations to be performed on homomorphically encrypted data, and the like. Further, as training a machine learning model is an already computationally expensive task, using fully homomorphically encrypted data to train a machine learning model may further increase the computational expense of training a machine learning model.

Accordingly, techniques are needed to accelerate training of machine learning models using homomorphically encrypted data.

BRIEF SUMMARY

Certain embodiments provide a computer-implemented method for adaptively reducing the bit size of features in a training data set used to train a machine learning model. The method generally includes receiving a data set to be used in training a machine learning model and a definition of the machine learning model to be trained. A reduced number of bits to represent features in the data set is determined based on values of each feature in the data set and the definition of the machine learning model, the reduced number of bits being smaller than a number of bits defining each feature in the data set. A reduced bit-size data set is generated by reducing a bit size of each feature in the data set according to the reduced number of bits, and the reduced bit-size data set is encrypted using a homomorphic encryption scheme. A machine learning model is trained based on the encrypted reduced bit-size data set.

Other embodiments provide a system comprising a processor and a non-transitory computer-readable memory storing instructions that, when executed by the processor, perform an operation for adaptively reducing the bit size of features in a training data set used to train a machine learning model. The operation generally includes receiving a data set to be used in training a machine learning model and a definition of the machine learning model to be trained. A reduced number of bits to represent features in the data set is determined based on values of each feature in the data set and the definition of the machine learning model, the reduced number of bits being smaller than a number of bits defining each feature in the data set. A reduced bit-size data set is generated by reducing a bit size of each feature in the data set according to the reduced number of bits, and the reduced bit-size data set is encrypted using a homomorphic encryption scheme. A machine learning model is trained based on the encrypted reduced bit-size data set.

Still further embodiments provide a computer-implemented method for generating predictions from a machine learning model trained using a reduced-size homomorphically encrypted data set. The method generally includes receiving an encrypted input on which a machine learning model trained using a reduced-size homomorphically encrypted data set is to generate a predicted value. A reduced bit-size prediction is generated based on the received encrypted input and is decompressed based on a reduction in a bit size of the reduced-size homomorphically encrypted data set relative to an uncompressed data set. The decompressed prediction is output as the predicted value from the machine learning model.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 4 illustrates an example compression of data that removes unused bits and an offset from a data set prior to encryption and use in training a machine learning model.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums for reducing the bit size of features in encrypted training data sets used to train machine learning models.

Generally, mathematical operations performed on homomorphically encrypted data may have an execution time that is proportional to a number of bits used to represent each encrypted value. Because mathematical operations performed on homomorphically encrypted data are generally computationally expensive, increasing the number of bits used to represent each encrypted value may increase the computational expense of an operation. Likewise, decreasing the number of bits used to represent each encrypted value may decrease the computational expense of an operation, but at the cost of information loss.

Training machine learning models based on a given data set is also a computationally expensive operation. For example, training machine learning models using unencrypted data sets may entail the use of clusters of computing devices, which may include general purpose central processing units, graphics processing units, tensor processing units, application specific integrated circuits, and other specialized processors.

In some cases, to preserve the privacy of data used to train a machine learning model, a training data set may be encrypted using a homomorphically encryption scheme. However, the use of a homomorphically encrypted data set to train a machine learning model may add significant additional computational expense to the already computationally expensive process of training a machine learning model because of the added complication involved in performing mathematical operations on ciphertexts and noise reduction on the results of these mathematical operations.

Embodiments presented herein may accelerate training of a machine learning model using a homomorphically encrypted data set by reducing the bit size of features in the training data set used to train the machine learning model. Generally, the bit size of a feature in a data set may be reduced by eliminating unused bits, removing a shared offset from the value of each feature, and otherwise reducing the size of data needed to represent a feature without losing too much information used by the machine learning model.

In some embodiments, the bit size of features in a training data set may be reduced prior to encryption so that the encrypted training data set used to train the machine learning model include encrypted reduced bit-size feature values rather than uncompressed feature values. Further, predictions or inferences generated by the machine learning model may also be encrypted so that the privacy of data generated by the machine learning model may be preserved.

Figure 1:
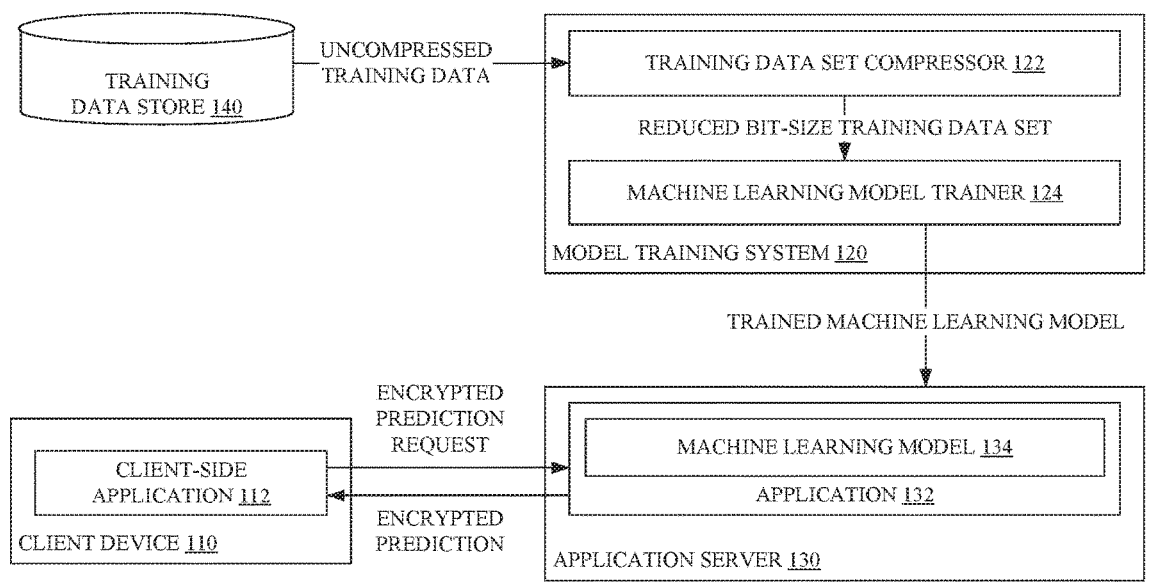
FIG. 1 illustrates an example computing environment in which data sets are compressed prior to encryption and in which the resulting encrypted and compressed data sets are used to train a machine learning model.

Example Adaptive Reduction of Feature Bit Size for Homomorphically Encrypted Data Sets Used to Train Machine Learning Models FIG. 1 illustrates a computing environment 100 in which the bit size of features in a training data set is reduced prior to encryption and use in training a machine learning model. As illustrated, computing environment 100 includes a client device 110, application server 120, a plurality of remote resources 130, and a login attempt data store 140.

Client device 110 generally hosts a client-side application 112 through which a user can request a prediction from a machine learning model 134 in application 132. The request may include one or more features to be used by the machine learning model 134 in generating a prediction or inference, and the features may be encrypted using an encryption key and a homomorphic encryption scheme. In response, client-side application 112 generally receives a prediction that is encrypted using the encryption key. The encryption key may be a key in an asymmetric encryption scheme where different keys are used for encryption and decryption, or a key in a symmetric encryption scheme where the same key is used for encryption and decryption. Client-side application 112 may decrypt the received prediction using the corresponding decryption key (which, as discussed, may be different from the encryption key in an asymmetric encryption scheme or the same as the encryption key in a symmetric encryption scheme) and may take one or more actions with respect to the decrypted prediction.

For example, client-side application 112 may display the decrypted prediction to a user of client device 110, perform one or more operations based on the decrypted prediction, display the results of the one or more operations to the user of client device 110, and the like.

Model training system 120 generally compresses a training data set into a reduced bit-size representation, encrypts the reduced bit-size representation of the training data set, and uses the encrypted reduced bit-size representation to train a machine learning model. As illustrated, model training system 120 includes a training data set compressor 122 and a machine learning model trainer 124. While training data set compressor 122 and machine learning model trainer 124 as illustrated as executing on model training system 120, it should be recognized that training data set compressor 122 and machine learning model trainer 124 may execute on different computing systems in other embodiments. For example, the training performed by machine learning model trainer 124 may be distributed to a plurality of processing systems.

Training data set compressor 122 generally receives a training data set from a training data store 140 and compresses the training data set into a reduced bit-size representation, as discussed in further detail below. Training data set compressor 122 may encrypt the reduced bit-size representation using an encryption key and a homomorphic encryption scheme, and the encrypted, reduced bit-size representation may be output by training data set compressor 122 to machine learning model trainer 124.

To compress a training data set into a reduced bit-size representation, training data set compressor 122 generally uses the values of a feature in each item in the training data set and the information defining the properties and structure of the machine learning model to be trained (e.g., an equation defining a regression model, a specification of a neural network including a number of layers, input features, output features, etc., and the like) to identify a bit-size reduction to perform on the feature. Generally, reductions in the bit size of features in a training data set may trade off an amount of accuracy (which may be provided by larger bit-sizes for a feature) for execution speed. These trade-offs may be made based on an expected impact that the reduction in bit-size may have on the accuracy of a prediction generated by a machine learning model. In some cases, while the bit-size representation of a feature may be reduced, fundamental features of the underlying data, such as ordinality in a data set or use in a comparison operation, may be preserved while preserving the accuracy of predictions made using the machine learning model despite the reduction in feature bit-size.

Example Training Data Compression for Comparison-Tree-Based Models

In some embodiments, the machine learning model for which training data set compressor 122 is generating a training data set may be a comparison tree-based model. In a comparison tree-based model, a finite number of options may exist for any specific feature used in the tree. For example, a comparison tree-based model may include a logical operations (e.g., AND, OR, XOR, etc. operations), where a first path is followed if a comparison resolves to Boolean TRUE, and a second path is followed if a comparison resolves to Boolean FALSE.

A comparison tree-based model may also or alternatively include a series of comparisons in respect of a specific feature (e.g., similar to a SWITCH statement in many programming languages), where a first path is followed if a first comparison resolves to Boolean TRUE, a second path is followed if a second comparison resolves to Boolean TRUE, and so on. Because a comparison tree-based model may have a finite number of comparisons for any given feature, the values of that given feature may be compressed into a number of bits commensurate with the number of paths that may result from the comparisons performed for that feature. For example, if a comparison tree-based model uses a logical operation for a feature, that feature may be compressed into a single bit. A value that results in the comparison resolving to Boolean TRUE may have a value of 1, and a value that results in the comparison resolving to Boolean FALSE may have a value of 0. The representation may be compressed into a smaller number of bits based on the number of possible paths for the logical operation. For example, if a comparison tree-based model uses a comparison with four cutoff values that results in one of five paths being selected for a feature, the data may be compressed into a minimum of three bits (i.e., a number of bits that supports up to 8 paths). In another example, if a comparison tree-based model uses a comparison with four cutoff values that results in one of five paths being selected for a feature, the feature may be compressed into a four-bit representation to provide additional redundancy or to simplify the bit patterns used to represent the different paths, where the bit patterns of 0000, 1000, 1100, 1110, and 1111 correlate to different paths being selected in the comparison tree. In some embodiments, the bit size of a feature used in a comparison tree may be n−1 bits, where n represents the number of comparison operations that may be performed in respect of the feature.

Example Compression of Numerical Training Data

In other cases, the machine learning model for which training data set compressor 122 generates a training data set may perform mathematical operations on feature values in order to generate a prediction. To accelerate the training and execution of such machine learning models, bit-size reduction techniques may be used to compress the bit size of a feature from the number of bits used in a standard data type (e.g., 16-bit short integer, 32-bit integer, 64-bit long integer, 32-bit float, 64-bit double precision float, etc.) to a number of bits needed to represent possible values of the feature. As discussed in further detail below, these reductions may include truncating unused bits from a standard data type and identifying offsets that can be used to further minimize the bit size of a feature.

In regression-based models, training data set compressor 122 can identify features to compress based on an expected impact on the output of the regression-based model. In one example, a regression-based model may be represented by the equation $\hat{y}=a_1 x_1 + a_3 x_3 + a_2 x_2 + \ldots + a_m x_m$, where a represents a coefficient and x represents the value of the corresponding feature. The output $\hat{y}$ may thus be affected more significantly by the value of a feature $x_1$ associated with a larger coefficient $a_1$ than the value of a feature $x_2$ associated with a smaller coefficient $a_2$. It should be noted that these techniques may be applied to various regression-based models; for example, a linear regression-based model need not include polynomial terms and may be represented by other equations. Thus, training data set compressor 122 can identify features x to compress (i.e., generate a reduced bit-size representation of) based on the corresponding coefficient. For example, training data set compressor 122 can select a number of features having the smallest corresponding coefficients or features having corresponding coefficients below a threshold value to compress. In some embodiments, the features to compress may be selected, for example, based on techniques such as the Lasso regularization method that attempts to minimize smaller weights, feature importance models, or other techniques that identify features that can be compressed with minimal expected impact on the output of the regression-based model.

More generally, given a model that uses a number of features x as input, the bit size of one or more of these features may be reduced in a manner that is expected to minimize the impact of bit-size reduction on the output of the model, as discussed in further detail below. By doing so, the bit size of the training data set may be minimized prior to encryption using a fully homomorphic encryption scheme to minimize the additional computational expense involved in training a machine learning model using homomorphically encrypted data.

To identify a bit-size reduction that may be performed on a feature, training data set compressor 122 can identify a data type of the feature to determine whether the feature is represented by a categorical or ordinal data type. For a categorical data type, each value generally represents a specific category in which the data falls. Because categorical data types generally are used to represent small numbers of categories, the number of bits used for a categorical data type may be significantly reduced. For example, a feature that is a categorical data type may be represented in a data store as a 32 bit signed integer, which has $2^{32}=4,294,967,296$ possible values (i.e., values from −2,147,483,648 to 2,147,483,647). However, the feature may only have a small number of possible values. Thus, to reduce the number of bits used to represent the feature, the bit size may be reduced to encompass the number of possible values defined for the feature. For example, if a feature has four possible categories represented by values 0-3, the bit size of the feature may be reduced from 32 bits to 2 bits ($2^2=4$ possible values), which saves 30 bits for the feature in each item in the training data set. In some embodiments, the bit size of the feature may be reduced to a number of bits sufficient to represent the maximum value of a feature in the training data set. For example, if a feature has five possible categories, which may necessitate a 3-bit representation, but a maximum value of 3 (e.g., binary "11") exists in the training data set, the bit size of the feature may be reduced to 2 bits based on an assumption that the maximum value in the training data set is representative of the maximum value that can be expected in similar data received in a production environment.

For ordinal data, bit-size reduction may preserve the order of the data. To preserve the order of the data, the bit size of such features may be reduced to a minimal bit representation needed to represent the maximum value of the feature. For example, suppose that each item in a data set includes an "amount" feature that has a maximum value of 150,000. The "amount" feature may be represented in the training data set as a 32-bit integer; however, as discussed above, a 32-bit integer may include more bits than needed to represent the maximum value of the feature. For example, to represent a feature with a maximum value of 150,000, 18 bits may be needed to represent the feature. That is, the binary representation of 150,000 may be represented in a 32-bit string as 00000000000000100100100111110000. However, the leading 14 bits are not needed to represent the maximum value of the feature and may thus be dropped without losing data fidelity. More generally, to identify the minimum number of bits needed to represent the maximum value of the feature, training data set compressor 122 can identify the number of bits that has a value exceeding the maximum value of the feature when all bits are set to 1. In some embodiments, the bit size of feature may be reduced to a number of bits that exceeds the minimum number of bits, which may allow for expansion in the values supported by the feature.

In some embodiments, additional compression may be performed against the minimal bit-size representation needed to represent the maximum value of the feature. To further compress the minimal bit-size representation, training data set compressor 122 can identify an offset that may be subtracted from the values of the feature in each item in the data set. The offset may be, for example, one or more most significant bits that are common to the bit representations of the feature value in each item in the data set. For example, assume that a minimal bit-size representation for a feature is 8 bits, and each item in the data set has a feature value with the same two most significant bits of "11" (i.e., each value may be represented by the bit pattern 11######). The offset may be determined to be the bit pattern 11000000=192, and the two most significant bits may be removed from the feature value in each item in the data set. The machine learning model may be reconfigured to add the offset to the feature value, where a value of the feature is being predicted, so that the offset is not lost.

Example Compression of Floating-Point Numbers in a Training Data Set

To reduce the bit size used to represent floating point numbers, floating point numbers may be converted from, for example, IEEE 754 formats, which define floating point numbers in terms of a base, a precision, and an exponent, into two integers. A first integer may represent the integer portion of the floating point number, and a second integer may represent the decimal portion of the floating point number. Each of these integers may be compressed, as discussed above, by identifying a minimum number of bits needed to compress the integer and by identifying an offset applicable to the integer (if any). In some embodiments, an offset may be calculated for the integer portion of the floating point number, but not for the decimal portion of the floating point number. Such a case may exist, for example, where a floating point number is used for data that has a limited number of possible values for the decimal portion of the floating point number and a larger number of possible values for the integer portion of the floating point number.

In some embodiments, the number of bits used to represent a floating point number may be determined based on a genetic algorithm used to identify an optimal number of bits based on the accuracy of inferences generated using a reduced bit-size representation. The genetic algorithm may be initiated with an initial number of bits to represent each of the integer and decimal portions of the floating point number. The genetic algorithm may generate a generation of items, with each item in the generation corresponding to a potential bit size and offset limitation for a feature. Training data set compressor 122 can assess a score generated by the genetic algorithm for each bit size and offset limitation to determine whether the bit size and offset limitation reduces the number of bits used to represent the floating point number while preserving some predetermined degree of fidelity. This predetermined degree of fidelity may, for example, be a threshold difference between the score associated with an uncompressed training data set and the score associated with a compressed data set. The score may be, for example, the F1 score, which may be a harmonic mean of a precision value and a recall value calculated for each set of integer and decimal bit-sizes generated by the genetic algorithm. The genetic algorithm can perform various genetic operations, such as mutation, crossover, and biased selection to produce new generations of items until the genetic algorithm executed by training data set compressor 122 stalls. Once the genetic algorithm stalls, training data set compressor 122 can select the bit size and offset limitations associated with the highest F1 score and use the selected bit size and offset limitations to reduce the bit size of the feature in each item in the training data set.

Once the training data set is compressed, resulting in a reduced bit-size data set that includes reduced bit-size representations of one or more features in each item in the data set, the reduced bit-size training data set may be encrypted. To allow for mathematical operations, including the operations performed during training of a machine learning model, to be performed, the reduced bit-size training data set may be encrypted using a fully homomorphic encryption scheme. The encrypted reduced bit-size training data set may be saved in training data store 140 and may be provided to machine learning model trainer 124 for use in training a machine learning model.

Machine learning model trainer 124 generally uses the encrypted reduced bit-size training data set and information defining properties of the machine learning model to train machine learning model 134 for deployment on application server 130. The machine learning model may be a regression model, a decision tree-based model, or any other machine learning model that can be trained using a training data set.

Generally, in training a machine learning model using a homomorphically encrypted data set, the machine learning model may be trained to generate results that are also homomorphically encrypted. The results generated by the machine learning model may be output in an encrypted form and decrypted by a client-side application 112 executing on a client device. By training and executing machine learning model operations using homomorphically encrypted data, embodiments presented herein may preserve the privacy of the underlying data used to train the machine learning model, the input data provided by the user into the machine learning model, and the results generated by the machine learning model.

Application server 130 generally hosts various components of a software application (e.g., application 132) and exposes these components for use by users of client device 110. As illustrated, application server 130 includes an application 132, which includes a machine learning model 134 trained using an encrypted reduced bit-size training data set.

Application 132 generally receives prediction requests including encrypted data from client-side application 112. The prediction requests generally include one or more input features, encrypted using a homomorphic encryption scheme, and an identification of the feature for which a prediction is to be made based on the encrypted input features. Application 132 generally provides the encrypted input features and the identification of the feature for which the prediction is to be made to machine learning model 134. In response, application 132 receives, from machine learning model 134, an encrypted prediction and forwards the encrypted prediction to client-side application 112 (e.g., for display on client device 110) as the response to the encrypted prediction request. While FIG. 1 illustrates the deployment of application 132 and the machine learning model 134 on an application server, it should be recognized that application 132 and the machine learning model 134 may be deployed on a client device for execution locally by the client device.

Machine learning model 134, as discussed, is generally a trained machine learning model trained by machine learning model trainer 124 using an encrypted reduced bit-size training data set. Machine learning model 134 can generate a prediction of the value of a feature based on encrypted reduced bit-size inputs for other features in the machine learning model by performing mathematical operations on the encrypted inputs without decrypting the inputs to obtain the underlying data.

In some embodiments, where machine learning model 134 is a decision tree-based model, application 132 can convert input values to the appropriate sized bit patterns and compare the converted input values to the bit patterns in the comparison tree.

In some embodiments, where client-side application 122 has knowledge apriori of the comparisons and bit-size reductions implemented by the machine learning model and training data set compressor 122, respectively, the input values may be converted to the appropriate sized bit patterns and encrypted. These converted and encrypted input values may be provided to machine learning model 134, and the comparison tree may be traversed using bitwise multiplication (e.g., bitwise AND) operations in respect of the input values and the values in the comparison tree for a given feature. A bitwise multiplication operation between an input value and the values in the comparison tree for a given feature that results in a bit pattern of all 1s may indicate the path through the comparison tree to follow. Because bitwise multiplication may be a computationally inexpensive process, compressing input values into a reduced-size representation may accelerate the process of traversing a comparison tree-based model. The output of the machine learning model 134 may be the output of the last leaf node in the path through the comparison tree to be followed. Based on the identified path, application 132 can perform the appropriate operations using homomorphically encrypted inputs provided by client-side application 112.

Generally, machine learning model 134 can generate a reduced bit-size prediction based on reduced bit-size inputs. Because the predictions generated by machine learning model 134 may be reduced in bit size relative to the actual prediction that would be generated had machine learning model 134 been trained using uncompressed data, machine learning model 134 may take one or more actions to reverse the bit-size reduction for the prediction.

For example, where a feature is associated with an offset, the offset (which may be a homomorphically encrypted constant value defined in the machine learning model) may be added back to the reduced bit-size prediction generated by the machine learning model 134. One or more padding bits may also be added back to the reduced bit-size prediction to expand the prediction to a bit size of the data type the feature is defined as. For example, where a feature is defined as a k-bit integer, and the sum of the reduced bit-size prediction and the offset is l bits, k-l bits may be added as the most significant bits in the bit representation of the prediction so that the prediction may be returned as a k-bit integer. In another example, where a feature is defined as a floating point value, and the prediction generated by the machine learning model 134 comprises an integer portion and a decimal portion of the floating point number, machine learning model 134 may convert the integer portion and the decimal portion to floating point numbers and add the converted integer and decimal portions together.

Figure 2:
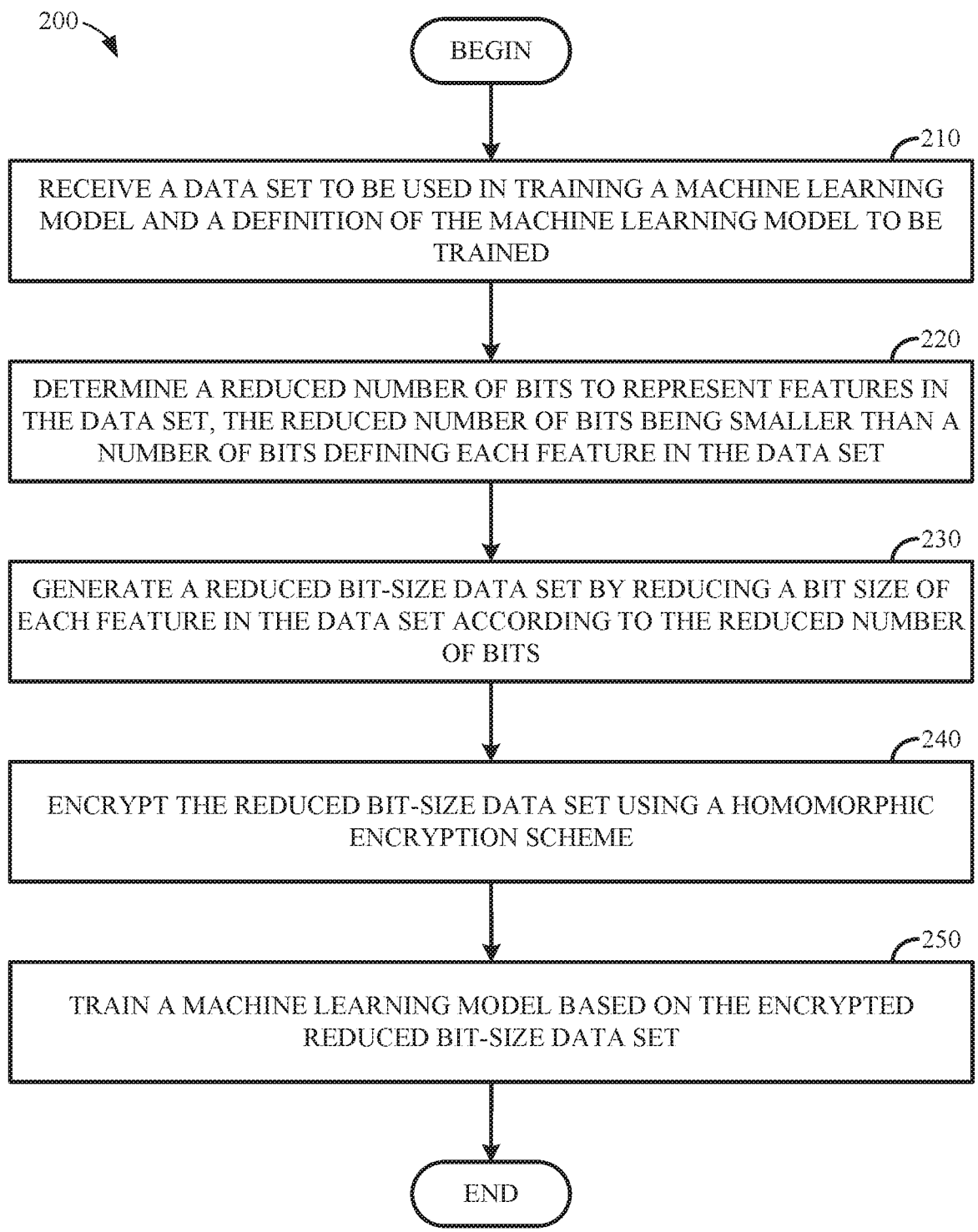
FIG. 2 illustrates example operations for encrypting and compressing data sets and training a machine learning model based on an encrypted and compressed data set.

Example Generation of an Encrypted Reduced Bit Size Data Set for Training a Machine Learning Model FIG. 2 illustrates example operations 200 for generating an encrypted, reduced bit-size data set for training a machine learning model. The operations described herein may be performed by a model training system (e.g., model training system 120 illustrated in FIG. 1) or on one or more computing devices in which portions of a machine learning model training system are deployed.

As illustrated, operations 200 begin at block 210, where the system receives a data set to be used in training a machine learning model and information defining properties of the machine learning model to be trained. The received data set may be unencrypted so that one or more bit-size reductions can be performed on the underlying data before encryption and use in training a machine learning model. The received data set generally does not include data provided by a subsequent user, and thus, may allow for training a training data set without decrypting the data provided by the subsequent user. Generally, the received data set may include a plurality of items (e.g., records from a database), and each item may include a plurality of features. Each feature may be defined in terms of a data type and a number of bits used to represent the feature (e.g., 16-bit short integer, 32-bit integer, 64-bit long integer, 32-bit single precision float, 64-bit double precision float, etc.).

At block 220, the system determines a reduced number of bits to represent one or more features in the data set. As discussed, to determine the reduced number of bits to represent a feature, the system can determine whether the feature is a categorical or ordinal feature. Categorical features may be reduced to a number of bits that can represent the number of different categories that are represented. In some embodiments, numerical features may be reduced to a number of bits commensurate with the maximum expected value for the feature. Further reductions in the number of bits used to represent a feature may account for offsets that may remove one or more most significant bits from the value of the feature in each item in the data set.

At block 230, the system generates a reduced bit-size data set by reducing a bit size of each feature in the data set according to the reduced number of bits determined for each feature. Generally, in generating the reduced bit-size data set, the system can convert each feature to a binary representation and remove bits determined to be redundant or shared across each item in the data set for the feature. In some embodiments, the system can convert the value of the feature in each item in the data set to a different value (e.g., where the feature is used in a decision tree) to reduce the value of the feature to a smaller representation.

At block 240, the system encrypts the reduced bit-size data set using a homomorphic encryption scheme. The homomorphic encryption scheme may use an arbitrarily sized encryption key to encrypt the reduced bit-size data set. The homomorphic encryption scheme may be a fully homomorphic scheme that allows for arbitrary mathematical operations to be performed on the encrypted data without needing to decrypt the data, such as the Brakerski-Gentry-Vaikuntanathan scheme, schemes based on the NTRU cryptosystem, the Brakerski/Fan-Vercauteren scheme, the Cheon-Kim-Kim-Song scheme, or other fully homomorphic encryption schemes.

At block 250, the system trains a machine learning model based on the encrypted reduced bit-size data set. Once trained, the system can deploy the machine learning model to an application server for use by an application, to a client-side device on which a machine learning model can be executed, or the like.

In some embodiments, the definition of the machine learning model may be a definition of a tree structure. In this tree structure, different paths may be reached based on comparisons of a feature in the data set to one or more values defined for the in the tree structure. The reduced number of bits to represent features in the data set may be a number of bits sufficient to uniquely represent each result of a set of comparisons in respect of the feature in the tree structure using a bitwise AND operation.

In some embodiments, the definition of the machine learning model may define a regression model including a plurality of coefficients associated with a plurality of features. The regression model may, for example, be a linear regression model, a logistic regression model, or the like. The system can determine the reduced number of bits to represent features in the data set by identifying coefficients associated with features of the plurality of features having a smallest impact on results generated by the model. The reduced bit-size data set may be generated by reducing a bit size of the features associated with the identified coefficients.

In some embodiments, the definition of the machine learning model may define a neural network model to be trained using a training data set. The definition of the neural network model may define an input layer identifying the inputs into the neural network model and an output layer identifying the data generated by the neural network. The system can determine the reduced number of bits to represent features in the data set by identifying, for example, redundant bits that can be removed from features in the training data set to reduce the size of the data used to train the neural network.

In some embodiments, the system can determine the reduced number of bits to represent features in the data set by identifying, in the data set, features representing categorical data. For these features representing categorical data, the system can identify a minimal bit size representation associated with a number of categories to be represented by the feature.

In some embodiments, the system can determine the reduced number of bits to represent features in the data set by identifying, in the data set, features representing ordinal data in which an order of values in the data set is to be maintained. The system may then identify a number of bits needed to maintain the order of values in the data set. The number of bits needed to maintain the order of values in the data set may be, for example, the minimum number of bits needed to represent the maximum value for a feature, a number of bits needed to represent the maximum value in a training data set for a feature, a number of bits that accounts for an offset common to the values of the feature across the items in the data set, and the like.

In some embodiments, the system can determine the reduced number of bits to represent features in the data set by identifying a maximum value of a feature defined as a numerical data type in the data set identifying a number of bits needed to represent the identified maximum value of the feature. For a floating point number, identifying the maximum value of the feature may include determining, for a floating point number, a maximum value of an integer portion of the floating point number and a maximum value of a decimal portion of the floating point number. A number of bits needed to represent the identified maximum value of the variable may be a first number of bits needed to represent the maximum value of the integer portion of the floating point number and a second number of bits needed to represent the maximum value of the decimal portion of the floating point number. The system may identify the first number of bits needed to represent the maximum value of the integer portion of the floating point number and the second number of bits needed to represent the maximum value of the decimal portion of the floating point number by selecting an initial number of bits for the first number of bits based on an expected maximum value of the integer portion of the floating point number. The system may also select an initial number of bits for the second number of bits based on an expected maximum value of the decimal portion of the floating point number. The first and second numbers of bits may be modified using a genetic algorithm configured to identify a best number of bits for the first and second numbers of bits.

In some embodiments, the system may further identify, from the reduced bit-size data set, a number of shared bits representing an offset for a feature shared by each item in the reduced bit-size data set. The feature may be associated with the identified offset in the machine learning model, and the system may remove a number of bits representing the offset from the feature in each item in the reduced bit-size data set. In some embodiments, to account for the removal of the identified offset from the feature in the training data set, the identified offset may be saved for future use. Where the system generates a predicted feature value, the predicted feature value may be a value in a reduced bit-size data set. To expand the predicted feature value (e.g., to reverse the compression performed on the feature prior to training the machine learning model), the identified offset may be added to the predicted feature value.

Example Feature Bit Size Reduction

Figure 3:
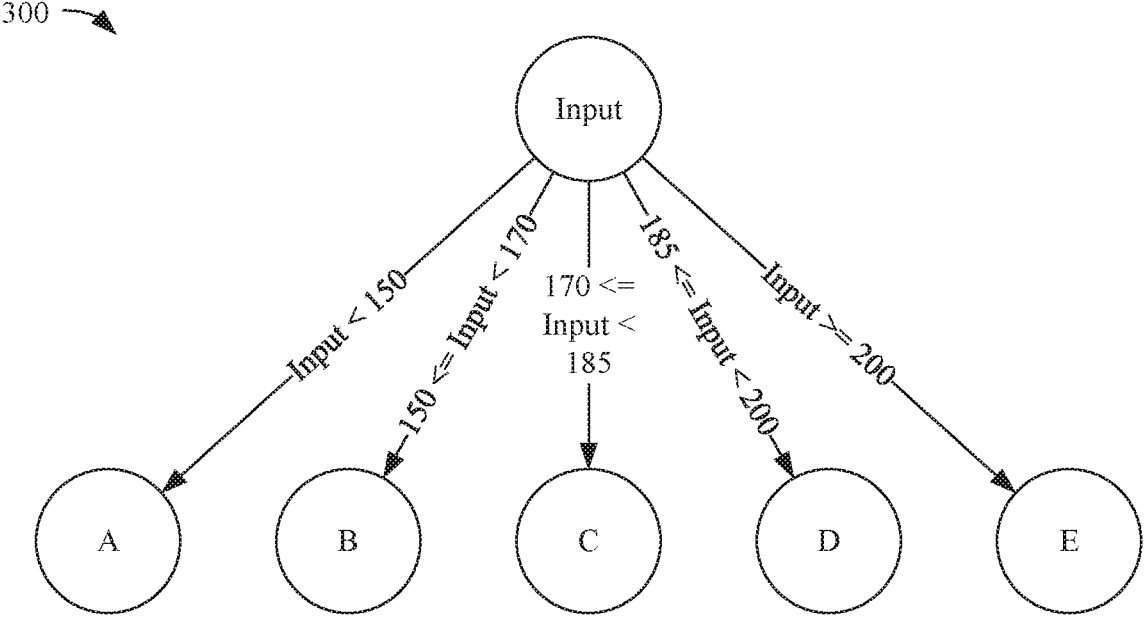
FIG. 3 illustrates an example compression of data that may be performed to implement a decision tree-based model using homomorphically encrypted data.
Figure 3:
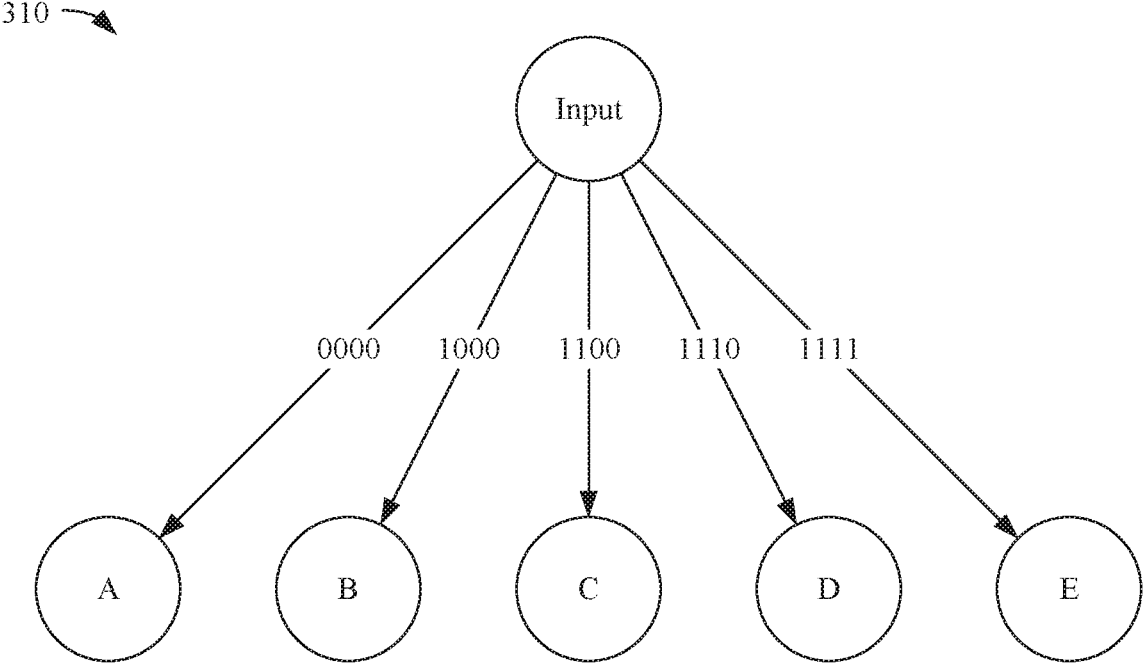

FIG. 3 illustrates an example decision tree and an associated feature bit size reduction that may be used to identify a path to traverse through the decision tree. As illustrated, decision tree 300 may represent a simple one-level decision tree in which comparisons of an input value to one or more threshold values may be used to identify a path to traverse in the tree. However, it should be recognized that a decision tree may include any number of levels representing different decisions made in respect of different features.

As illustrated, decision tree 300 has five different paths, one of which is executed based on the value of the input. The operation represented by node A may be executed if the input is less than 150; the operation represented by node B may be executed if the input is between 150 and 170; the operation represented by node C may be executed if the input is between 170 and 185; the operation represented by node D may be executed if the input is between 185 and 200; and the operation represented by node E may be executed if the input is greater than or equal to 200.

As discussed, performing these five comparisons using homomorphically encrypted data may be a computationally expensive task. To reduce the computational expense of identifying which path to traverse, a training data set compressor may reduce these comparisons to bitwise comparisons, where determining that the bits of an input value match the bits representing a comparison is used to identify an operation to be performed in the decision tree. As illustrated in decision tree 310, the comparisons may be reduced to a bitwise comparison of five bits. The path through the decision tree 310 to be traversed may be the path for which a bitwise multiplication (i.e., a logical AND operation) returns a value of all 1s. To do so, an input value may be compared to the cutoff values associated with one or more of the nodes A-E. Using the example illustrated in FIG. 3, if the input value is less than 150, the input value can be converted to a bit pattern of 0000. If the input value is between 150 and 170, the input value can be converted to a bit pattern of 1000. If the input value is between 170 and 185, the input value can be converted to a bit pattern of 1100. If the input value is between 185 and 200, the input value can be converted to a bit pattern of 1110. Finally, if the input value is greater than or equal to 200, the input value can be converted to a bit pattern of 1111. Using a bitwise AND operation on the bit pattern representations of the input value, a system can determine which operation to execute. For example, assume that an input value to execute an operation on is 169. The system can determine that the input value can be converted to the bit pattern of 1000, since the input value is between 150 and 170. A bitwise multiplication of 0000 and 1000 results in a bit pattern of 0111, indicating that operation A cannot be performed for the input value. A bitwise multiplication of 1000 and 1000 results in a bit pattern of 1111, and thus, the system can determine that operation B can be executed based on the input value.

FIG. 4 illustrates an example input data set and example reductions in the bit size of the data set that may be achieved using the technique described herein. As illustrated, the input data set 400 includes values that are defined in a database or other data structure as 32-bit integers. However, with a maximum value of 152, only eight bits are needed to represent the values included in input data set 400. Thus, 24 bits are unused, though still contribute to the computational expense of performing mathematical operations on encrypted data. More generally, the number of bits x that a feature in a data set may be reduced to may be represented by the equation:

$$x = \left\lceil \frac{\log(\text{max\_value})}{\log(2)} \right\rceil$$

where max_value represents the largest value that is either included in input data set 400 or is expected to be included as a value of the feature.

Reduced bit-size data set 410 illustrates the reduction of the input data set 400 into one or more reduced bit-size representations. A first reduced bit-size representation may convert the 32-bit integers in input data set 400, after the unused 24 bits are discarded, into an 8-bit binary representation.

Further reductions in the bit-size used to represent input data set 400 may be identified based on a shared offset that may be subtracted from the values in the input data set 400. For example, as illustrated, the 8-bit binary representations for each item in the input data set shares the same most significant bits (i.e., most significant bits "10"). Because each item in the input data set shares the same most significant bits, the bit size of the input data set may be further reduced by specifying an offset and calculating a remainder for each item in the data set. As illustrated, an offset of binary 10000000=128 may be subtracted from each item in the input data set and saved in the machine learning model for use in generating predictions of a feature value. By subtracting this offset from each item in the input data set, the bit size of the input data set may be further reduced to 7 bits, which is less than 25 percent of the bit size of a 32-bit integer as specified in the definition of the data set. Such a reduction, as discussed, may accelerate the process of training a machine learning model based on an encrypted version of the reduced bit-size data set 410.

Figure 5:
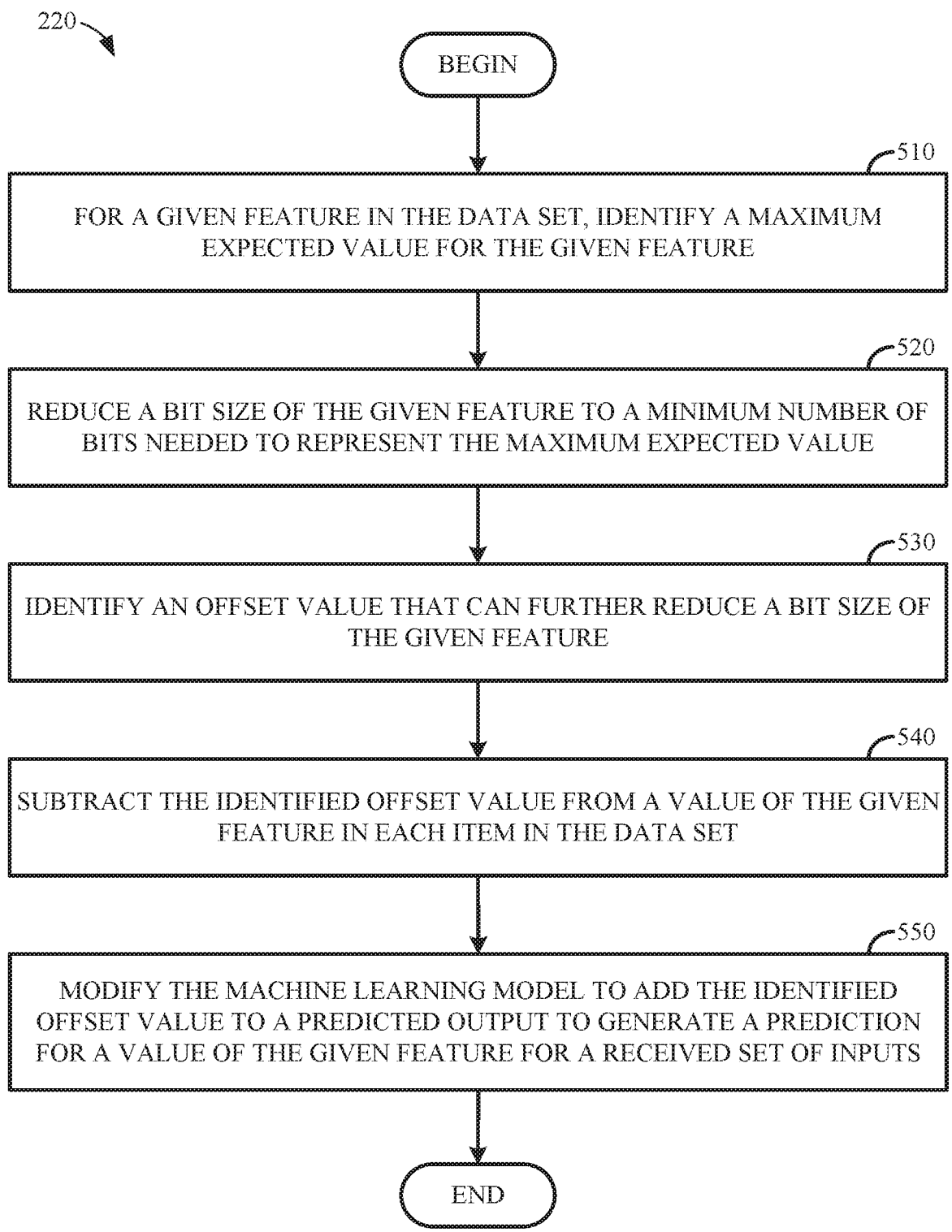
FIG. 5 illustrates example operations for generating a reduced bit-size data set based on unused bits and an offset common to elements in the reduced bit-size data set.

Example Reduction of a Feature Bit Size Based on Unused Bits and a Common Offset FIG. 5 illustrates further details of example operations 220 (illustrated in FIG. 2) that may be performed to determine the reduced number of bits needed to represent a feature in a data set used to train a machine learning model.

As illustrated, operations 200 may begin at block 510, where, for a given feature in the data set, the system identifies a maximum expected value for the given feature. In identifying the maximum expected value for the given feature, the system can identify the maximum value for the feature in a received input data set and add a predetermined amount to account for larger feature values that may not be reflected in the input data set. This predetermined amount may be an a priori determined value associated with each feature that may be determined, for example, based on an analysis of values previously encountered for a feature or values that are expected to be encountered for the feature.

At block 520, the system reduces a bit size of the given feature to a minimum number of bits needed to represent the maximum expected value. Generally, the minimum number of bits may be the number of bits that, when all bits are set to 1, results in a value that is less than the maximum expected value for the feature. As discussed, in embodiments where a feature is defined as a floating point number, the system can convert a floating point number in typical formats (e.g., IEEE 754) into integer and decimal portions. The system can then identify a minimum number of bits needed to represent the integer and decimal portions of the floating point number.

At block 530, the system identifies an offset value that can further reduce a bit size of the given variable. The offset value may be, for example, one or more most significant bits that are common across the entries in the input data set.

At block 540, the system subtracts the identified offset value from a value of the given feature in each item in the data set. As discussed, this may further reduce the bit size of the feature by the number of bits from which the identified offset value was generated.

At block 550, the system modifies the machine learning model to add the identified offset value to a predicted output. The sum of a predicted output and the identified offset value may be established as the prediction for the value of the given feature for a received set of inputs.

Figure 6:
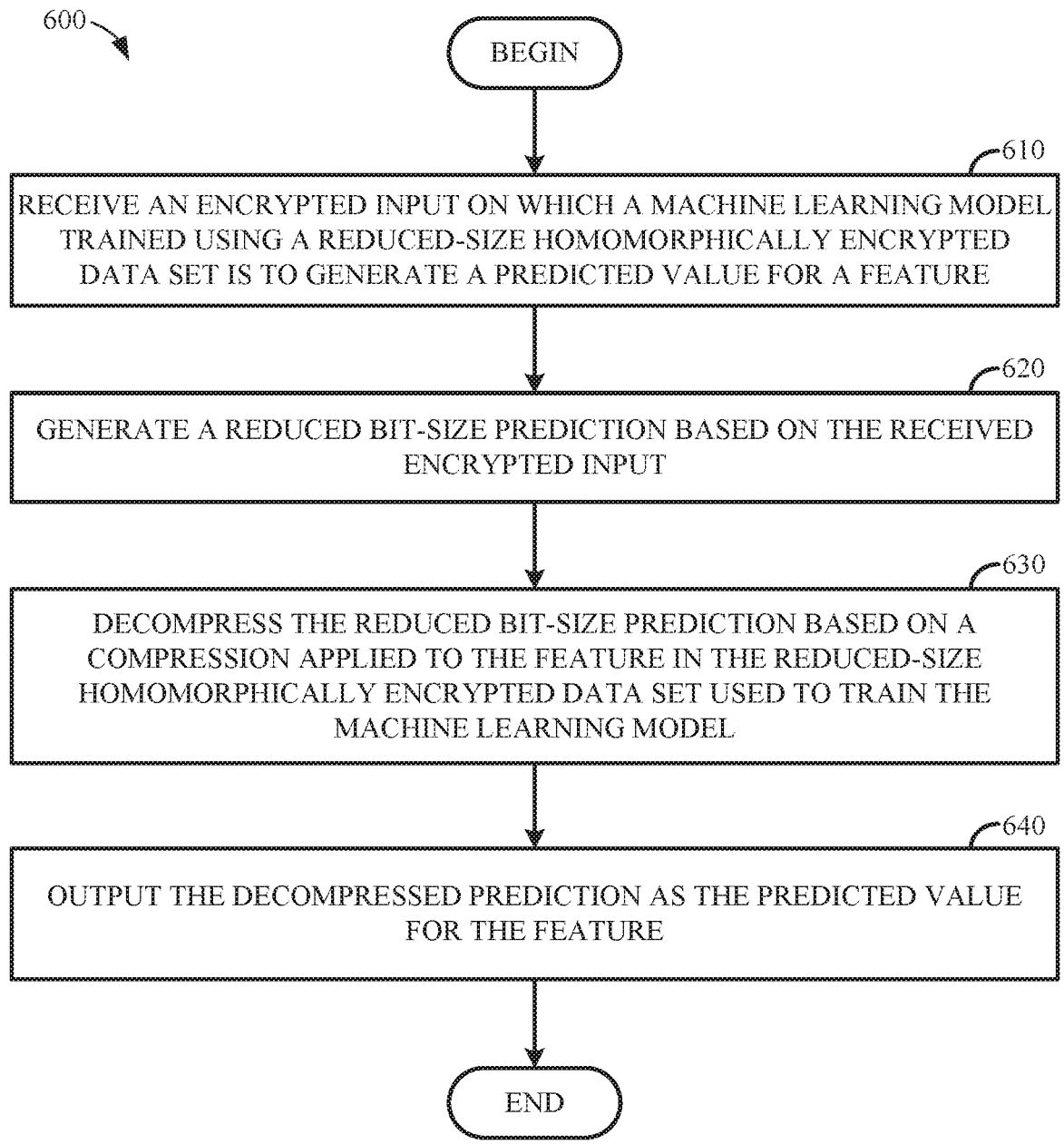
FIG. 6 illustrates example operations for generating a predicted value of a variable using a machine learning model trained using a reduced bit-size data set.

Example Generation of a Prediction Using a Machine Learning Model Trained Using a Reduced Bit Size Homomorphically Encrypted Training Data Set FIG. 6 illustrates example operations 600 for generating a prediction using a machine learning model trained using a reduced bit size homomorphically encrypted training data set. Operations 600 may be performed by a system on which a machine learning model is deployed for use by users of an application, such as application server 130 illustrated in FIG. 1 or a client device 110 illustrated in FIG. 1 on which a machine learning model may be executed (e.g., on specialized processors, such as neural processing units, tensor processing units, or the like).

Operations 600 may begin at block 610, where a system receives an encrypted input on which a machine learning model is to generate a predicted value for a feature. The encrypted input and the data set used to train the machine learning may be encrypted using a fully homomorphic encryption scheme, which allows mathematical operations to be performed on the data without needing to decrypt the data before performing mathematical operations.

At block 620, the system generates a reduced bit-size prediction based on the received encrypted input. The reduced bit-size prediction may be an encrypted value, as the machine learning model may be trained to generate predictions or inferences that are encrypted using a homomorphic encryption scheme based on homomorphically encrypted data.

At block 630, the system decompresses the reduced bit-size prediction based on a compression applied to the feature in the data set used to train the machine learning model. To decompress the reduced bit-size prediction, the system may add any offset to the reduced bit-size prediction and add unused padding bits back to the reduced bit-size prediction so that the decompressed prediction has the correct number of bits corresponding to a data type associated with the feature. In some embodiments, as discussed, where a feature is defined as a floating point value, a prediction may be generated as two integers—a first representing the integer portion of a floating point number, and a second representing the decimal portion of the floating point number. These two integers may be converted to floating point numbers and combined.

At block 640, the system outputs the decompressed prediction as the predicted value for the variable. In some embodiments, the decompressed prediction may be generated as an encrypted value that can be decrypted using the same key as that needed to decrypt the encrypted input. Where operations 600 are performed on a client device 110, the client device 110 may further decrypt the decompressed prediction for presentation to the user of the client device 110.

Figure 7:
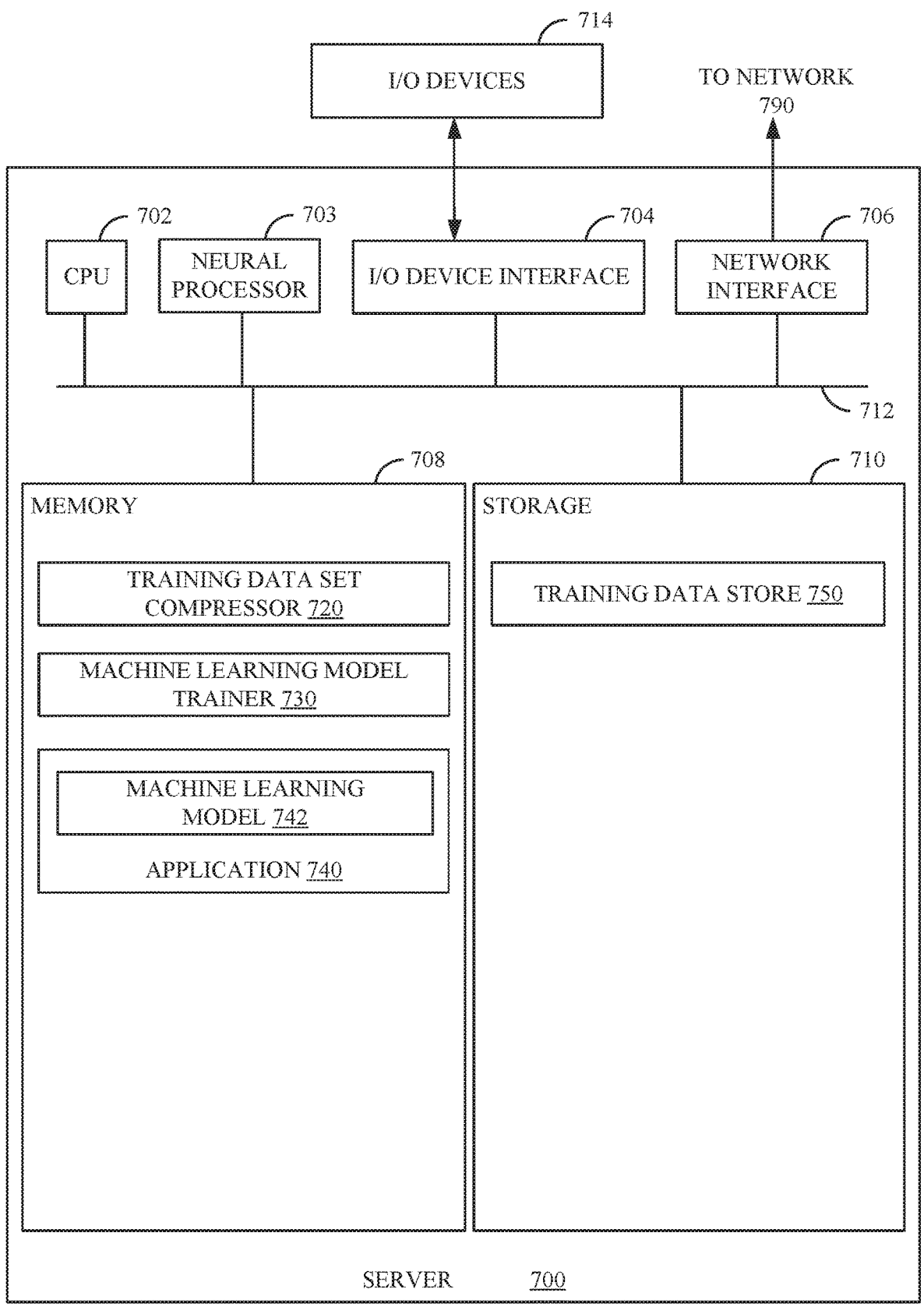
FIG. 7 illustrates an example computing system with which embodiments of the present disclosure may be implemented.

Example Systems for Adaptively Reducing Feature Bit Size for Homomorphically Encrypted Data Sets Used to Train Machine Learning Models FIG. 7 illustrates an example system 700 that reduces the bit size of features in a training data set used to train a machine learning model.

As shown, server 700 includes a central processing unit (CPU) 702, a neural processor 703, one or more I/O device interfaces 704 that may allow for the connection of various I/O devices 714 (e.g., keyboards, displays, mouse devices, pen input, etc.) to the server 700, network interface 706 through which server 700 is connected to network 790 (which may be a local network, an intranet, the internet, or any other group of computing devices communicatively connected to each other), a memory 708, storage 710, and an interconnect 712.

CPU 702 and neural processor 703 may retrieve and execute programming instructions stored in the memory 708. Similarly, the CPU 702 and neural processor 703 may retrieve and store application data residing in the memory 708. The interconnect 712 transmits programming instructions and application data, among the CPU 702, neural processor 703, I/O device interface 704, network interface 706, memory 708, and storage 710.

CPU 702 is included to be representative of a single CPU, multiple CPUs, a single CPU having multiple processing cores, and the like.

Neural processor 703 is included to be representative of a processor dedicated to performing various machine learning tasks. A neural processor 703 may be, for example, a neural processing unit (NPU), a tensor processing unit (TPU), an application-specific integrated circuit (ASIC), a field programmable gate array (FPGA) programmed to perform various machine learning tasks, or the like.

Memory 708 is representative of a volatile memory, such as a random access memory, or a nonvolatile memory, such as nonvolatile random access memory, phase change random access memory, or the like. As shown, memory 708 includes a training data set compressor 720, machine learning model trainer 730, and application 740. Training data set compressor 720 is generally configured to receive a raw training data set from a repository (e.g., training data store 750) including a plurality of items, with each item including a plurality of features, and reduce the bit size of one or more features in the training data set. To reduce the bit size of one or more features in the training data set, training data set compressor 720 can use information about the maximum value of a feature and shared most significant bits to reduce the number of bits used to define the value of a feature in the training data set. The shared most significant bits may be translated into an offset value that is subtracted from the value of the feature in each item in the training data set and may be saved in the machine learning model for use in generating predictions for the feature. Once the training data set is compressed into a reduced bit-size representation, the training data set may be encrypted using a homomorphic encryption scheme and provided to machine learning model trainer 730 for use in training a machine learning model.

Machine learning model trainer 730 generally uses the definition of a machine learning model and the encrypted, reduced bit-size training data set to train and deploy a machine learning model (e.g., machine learning model 742 illustrated in FIG. 7). As discussed, because the encrypted, reduced bit-size training data set may be encrypted using a homomorphic encryption scheme, the training data set need not be decrypted prior to use in training the machine learning model or in performing other mathematical operations in respect of the training data set.

Application 740 generally represents a variety of applications that can use a machine learning model (e.g., machine learning model 742) to generate a prediction of the value of a feature based on a given input. Application 740 generally receives an encrypted data set as input and generates an encrypted prediction as output. Again, because of the nature of homomorphically encrypted data, mathematical operations (e.g., inference operations defined according to an equation $y=f(X)$) may be performed without needing to decrypt the data, and the result may be an encrypted value that may be decrypted using the corresponding decryption key to the encryption key used to encrypt the training data set and the received input.

Storage 710 is representative of a non-volatile memory, such as a disk drive, solid state drive, or a collection of storage devices distributed across multiple storage systems. Although shown as a single unit, the storage 710 may be a combination of fixed and/or removable storage devices, such as fixed disc drives, removable memory cards or optical storage, network attached storage (NAS), or a storage area-network (SAN). Storage 710, as illustrated, may include a training data store 750. Training data store 750 may include a plurality of records that may be used to train a machine learning model. The records stored in training data store 750 may be used by training data set compressor 720 to generate a reduced bit-size training data set, as discussed above.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for training a machine learning model using a homomorphically encrypted reduced-size data set, comprising:
   receiving a data set to be used in training a machine learning model and information defining properties of the machine learning model to be trained;
   determining, based on values of one or more features of the received data set and the properties of the machine learning model, a reduced number of bits to represent, in a reduced bit-size data set, one or more features of the received data set, the reduced number of bits being smaller than a number of bits representing the one or more features of the received data set;
   generating the reduced bit-size data set, the generating comprising reducing a bit size of the one or more features according to the reduced number of bits;
   encrypting the reduced bit-size data set using a homomorphic encryption scheme; and
   training the machine learning model based on the encrypted reduced bit-size data set.

2. The method of claim 1, wherein:
   the properties of the machine learning model comprise a definition of a tree structure in which different paths through the tree structure are reached based on comparisons of a feature of the data set to one or more values defined for the feature in the tree structure; and
   the reduced number of bits is greater than or equal to a number of bits sufficient to uniquely represent each result of a set of comparisons using a bitwise AND operation.

3. The method of claim 1, wherein:
   the properties of the machine learning model comprise a definition of a regression model including a plurality of coefficients associated with a plurality of features;
   determining the reduced number of bits comprises identifying coefficients associated with features of the plurality of features having a smallest impact on results generated by the regression model; and
   the one or more features comprise the features associated with the identified coefficients.

4. The method of claim 1, wherein determining the reduced number of bits comprises:
   identifying, in the data set, features representing categorical data; and
   determining a representation associated with a number of categories to be represented by the features representing categorical data, wherein the representation has a minimal bit size for representing the categorical data.

5. The method of claim 1, wherein determining the reduced number of bits comprises:
   identifying, in the data set, features representing ordinal data in which an order of values in the data set is to be maintained; and
   determining a number of bits needed to maintain the order of values in the data set.

6. The method of claim 1, wherein determining the reduced number of bits comprises:
   identifying a maximum value of a feature of the data set that has a numerical data type; and
   determining a number of bits needed to represent the identified maximum value of the feature.

7. The method of claim 6, wherein:
- identifying the maximum value of the feature comprises determining, for a floating point number, a maximum value of an integer portion of the floating point number and a maximum value of a decimal portion of the floating point number; and
- determining the number of bits needed to represent the identified maximum value of the feature comprises determining a first number of bits needed to represent the maximum value of the integer portion of the floating point number and a second number of bits needed to represent the maximum value of the decimal portion of the floating point number.

8. The method of claim 7, wherein determining the first number of bits needed to represent the maximum value of the integer portion of the floating point number and the second number of bits needed to represent the maximum value of the decimal portion of the floating point number comprises:
- selecting an initial number of bits for the first number of bits based on an expected maximum value of the integer portion of the floating point number;
- selecting an initial number of bits for the second number of bits based on an expected maximum value of the decimal portion of the floating point number; and
- modifying the first and second numbers of bits using a genetic algorithm configured to identify a best number of bits for the first and second numbers of bits, the genetic algorithm starting the modification from the initial number of bits for the first number of bits and the initial number of bits for the second number of bits.

9. The method of claim 1, further comprising:
- identifying, from the reduced bit-size data set, a number of shared bits representing an offset for a feature in the reduced bit-size data set;
- associating the feature with the identified offset in the machine learning model; and
- removing a number of bits representing the offset from the feature in each item in the reduced bit-size data set.

10. A system, comprising:
- a processor; and
- a memory having instructions stored thereon which, when executed by the processor, performs an operation for training a machine learning model using a homomorphically encrypted reduced-size data set, the operation comprising:
  - receiving a data set to be used in training a machine learning model and information defining properties of the machine learning model to be trained;
  - determining, based on values of one or more features of the received data set and the properties of the machine learning model, a reduced number of bits to represent, in a reduced bit-size data set, one or more features of the received data set, the reduced number of bits being smaller than a number of bits representing the one or more features of the received data set;
  - generating the reduced bit-size data set, the generating comprising reducing a bit size of the one or more features in the data set according to the reduced number of bits;
  - encrypting the reduced bit-size data set using a homomorphic encryption scheme; and
  - training the machine learning model based on the encrypted reduced bit-size data set.

11. The system of claim 10, wherein:
- the properties of the machine learning model comprise a definition of a tree structure in which different paths through the tree structure are reached based on comparisons of a feature of the data set to one or more values defined for the feature in the tree structure; and
- the reduced number of bits is greater than or equal to a number of bits sufficient to uniquely represent each result of a set of comparisons using a bitwise AND operation.

12. The system of claim 10, wherein:
- the properties of the machine learning model comprise a definition of a regression model including a plurality of coefficients associated with a plurality of features;
- determining the reduced number of bits comprises identifying coefficients associated with features of the plurality of features having a smallest impact on results generated by the regression model; and
- the one or more features comprise the features associated with the identified coefficients.

13. The system of claim 10, wherein determining the reduced number of bits comprises:
- identifying, in the data set, features representing categorical data; and
- determining a representation associated with a number of categories to be represented by the features representing categorical data, wherein the representation has a minimal bit size for representing the categorical data.

14. The system of claim 10, wherein determining the reduced number of bits comprises:
- identifying, in the data set, features representing ordinal data in which an order of values in the data set is to be maintained; and
- determining a number of bits needed to maintain the order of values in the data set.

15. The system of claim 10, wherein determining the reduced number of bits comprises:
- identifying a maximum value of a feature of the data set that has a numerical data type; and
- determining a number of bits needed to represent the identified maximum value of the feature.

16. The system of claim 15, wherein:
- identifying the maximum value of the feature comprises determining, for a floating point number, a maximum value of an integer portion of the floating point number and a maximum value of a decimal portion of the floating point number; and
- determining the number of bits needed to represent the identified maximum value of the feature comprises determining a first number of bits needed to represent the maximum value of the integer portion of the floating point number and a second number of bits needed to represent the maximum value of the decimal portion of the floating point number.

17. The system of claim 16, wherein determining the first number of bits needed to represent the maximum value of the integer portion of the floating point number and the second number of bits needed to represent the maximum value of the decimal portion of the floating point number comprises:
- selecting an initial number of bits for the first number of bits based on an expected maximum value of the integer portion of the floating point number;
- selecting an initial number of bits for the second number of bits based on an expected maximum value of the decimal portion of the floating point number; and
- modifying the first and second numbers of bits using a genetic algorithm configured to identify a best number of bits for the first and second numbers of bits, the genetic algorithm starting the modification from the initial number of bits for the first number of bits and the initial number of bits for the second number of bits.

18. The system of claim 10, further comprising:

identifying, from the reduced bit-size data set, a number of shared bits representing an offset for a feature in the reduced bit-size data set;

associating the feature with the identified offset in the machine learning model; and removing a number of bits representing the offset from the feature in each item in the reduced bit-size data set.

19. A computer-implemented method for generating predictions from a machine learning model trained using a reduced-size homomorphically encrypted data set, comprising:

receiving an encrypted input on which a machine learning model is to generate a predicted value, the machine learning model trained using a homomorphically encrypted data set having a reduced size relative to an uncompressed data set;

generating a reduced bit-size prediction based on the received encrypted input;

decompressing the reduced bit-size prediction based on a compression applied to one or more features in the homomorphically encrypted data set, wherein decompressing the reduced bit-size prediction comprises:

modifying the reduced bit-size prediction, the modifying comprising adding an offset associated with a type of the predicted value to the reduced bit-size prediction, and adding one or more padding bits to the modified prediction, wherein the addition of the one or more padding bits to the modified prediction does not change a value of the modified prediction; and outputting the decompressed prediction as the predicted value from the machine learning model.

\* \* \* \* \*